United States Patent
FitzGerald et al.

(10) Patent No.: US 8,015,403 B2
(45) Date of Patent: Sep. 6, 2011

(54) METHOD AND SYSTEM INDICATING A LEVEL OF SECURITY FOR VOIP CALLS THROUGH PRESENCE

(75) Inventors: Cary W. FitzGerald, Pleasanton, CA (US); Cullen F. Jennings, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1000 days.

(21) Appl. No.: 11/092,782

(22) Filed: Mar. 28, 2005

(65) Prior Publication Data
US 2006/0218399 A1 Sep. 28, 2006

(51) Int. Cl.
*H04L 9/00* (2006.01)
(52) U.S. Cl. .......... 713/168; 713/153; 713/160; 726/25; 726/26; 709/219; 709/225; 709/238; 709/239; 455/410; 455/411
(58) Field of Classification Search .................. 713/1, 2, 713/168, 188, 194, 153, 160; 380/200, 201, 380/255, 277; 726/2, 26, 25; 709/219, 255, 709/225, 238, 239; 455/410, 411
See application file for complete search history.

(56) References Cited

U.S. PATENT DOCUMENTS

| | | | |
|---|---|---|---|
| 3,963,874 A | 6/1976 | Pommerening et al. | 179/18 |
| 4,809,321 A | 2/1989 | Morganstein et al. | 379/211 |
| 5,134,610 A | 7/1992 | Shand et al. | 370/60 |
| 5,526,416 A | 6/1996 | Dezonno et al. | 379/265 |
| 5,649,105 A | 7/1997 | Aldred et al. | 395/200.04 |
| 5,724,420 A | 3/1998 | Torgrim | 379/372 |
| 5,742,905 A | 4/1998 | Pepe et al. | 455/461 |
| 5,940,591 A | 8/1999 | Boyle et al. | |
| 5,991,645 A | 11/1999 | Yuen et al. | 455/568 |
| 6,295,354 B1 | 9/2001 | Dezonno | 379/266 |
| 6,301,339 B1 | 10/2001 | Staples et al. | |
| 6,353,886 B1 | 3/2002 | Howard et al. | 713/156 |
| 6,463,471 B1 | 10/2002 | Dreke et al. | |
| 6,501,750 B1 | 12/2002 | Shaffer et al. | 370/352 |
| 6,510,162 B1 | 1/2003 | Fijolek et al. | 370/432 |
| 6,546,087 B2 | 4/2003 | Shaffer et al. | 379/90.01 |
| 6,546,097 B1 | 4/2003 | Peltz | 379/265.07 |
| 6,567,505 B1 | 5/2003 | Omori et al. | 379/84 |
| 6,697,462 B2 | 2/2004 | Raymond | 379/93.02 |
| 6,748,543 B1 | 6/2004 | Vilhuber | 713/201 |
| 6,751,463 B1 | 6/2004 | Lorello et al. | 455/466 |
| 6,754,712 B1 | 6/2004 | Valencia | 709/227 |
| 6,757,722 B2 | 6/2004 | Lonnfors et al. | 709/220 |
| 6,760,322 B1 | 7/2004 | Fukuda et al. | 370/352 |

(Continued)

OTHER PUBLICATIONS

M. Day et al., "A Model for Presence and Instant Messaging," RFC 2778, The Internet Society, 17 pages, 2000.

(Continued)

*Primary Examiner* — Saleh Najjar
*Assistant Examiner* — Joseph Pan
(74) *Attorney, Agent, or Firm* — Baker Botts L.L.P.

(57) ABSTRACT

In accordance with a particular embodiment of the present invention, a method for providing security information associated with a prospective communication session to a user includes providing at least one communication network for the establishment of a prospective communication session between a first network device and a second network device. A security rating is assigned to the prospective communication session, and security information is provided to a user associated with the first network device that includes the security rating.

24 Claims, 2 Drawing Sheets

U.S. PATENT DOCUMENTS

| | | | |
|---|---|---|---|
| 6,766,165 B2 | 7/2004 | Sharma et al. | 455/423 |
| 6,785,266 B2 | 8/2004 | Swartz | 370/352 |
| 6,788,779 B2 | 9/2004 | Ostapchuck | 379/265.02 |
| 6,807,423 B1 | 10/2004 | Armstrong et al. | 455/440 |
| 6,853,634 B1 | 2/2005 | Davies et al. | 370/349 |
| 6,928,473 B1 | 8/2005 | Sundaram et al. | |
| 6,930,983 B2 | 8/2005 | Perkins et al. | 370/252 |
| 6,959,184 B1* | 10/2005 | Byers et al. | 455/410 |
| 7,010,292 B2 | 3/2006 | Jerbi et al. | 455/414.1 |
| 7,039,713 B1 | 5/2006 | Van Gunter et al. | 709/229 |
| 7,042,988 B2 | 5/2006 | Juitt et al. | 379/88.17 |
| 7,043,643 B1 | 5/2006 | Doe et al. | 713/189 |
| 7,043,753 B2 | 5/2006 | Roddy et al. | 726/11 |
| 7,058,387 B2 | 6/2006 | Kumar et al. | |
| 7,062,563 B1 | 6/2006 | Lewis et al. | |
| 7,149,801 B2 | 12/2006 | Burrows et al. | 709/225 |
| 7,242,421 B2 | 7/2007 | Center, Jr. et al. | 348/14.1 |
| 7,260,632 B2 | 8/2007 | Shaffer et al. | |
| 7,379,461 B2 | 5/2008 | Wu et al. | |
| 7,418,736 B2 | 8/2008 | Ghanea-Hercock | |
| 2001/0042202 A1 | 11/2001 | Horvath et al. | |
| 2002/0019853 A1 | 2/2002 | Vange et al. | 709/207 |
| 2002/0024947 A1 | 2/2002 | Luzzatti et al. | |
| 2002/0112073 A1 | 8/2002 | MeLampy et al. | 709/240 |
| 2002/0150041 A1 | 10/2002 | Reinshmidt et al. | 370/216 |
| 2002/0172365 A1* | 11/2002 | Nakagomi et al. | 380/270 |
| 2002/0181394 A1 | 12/2002 | Partain et al. | |
| 2003/0083041 A1 | 5/2003 | Kumar et al. | 455/406 |
| 2003/0107991 A1 | 6/2003 | Tezuka et al. | 370/229 |
| 2003/0225549 A1 | 12/2003 | Shay et al. | |
| 2004/0034793 A1 | 2/2004 | Yuan | |
| 2004/0071084 A1 | 4/2004 | El-Hennawey et al. | 370/230 |
| 2004/0073690 A1 | 4/2004 | Hepworth et al. | 709/230 |
| 2004/0249910 A1 | 12/2004 | Jerbi et al. | |
| 2005/0022180 A1 | 1/2005 | Couturier | 717/173 |
| 2005/0066033 A1* | 3/2005 | Cheston et al. | 709/225 |
| 2005/0075842 A1 | 4/2005 | Ormazabal et al. | |
| 2005/0083912 A1 | 4/2005 | Afshar et al. | |
| 2005/0086495 A1 | 4/2005 | Sheth et al. | 713/182 |
| 2005/0188194 A1 | 8/2005 | Fascenda | 713/155 |
| 2005/0210148 A1 | 9/2005 | Kato et al. | |
| 2005/0228895 A1 | 10/2005 | Karunamurthy et al. | 709/229 |
| 2005/0232184 A1 | 10/2005 | Borella | |
| 2005/0262195 A1 | 11/2005 | Ono et al. | 709/203 |
| 2005/0283837 A1 | 12/2005 | Olivier et al. | 726/24 |
| 2006/0041936 A1* | 2/2006 | Anderson et al. | 726/11 |
| 2006/0047782 A1 | 3/2006 | Niemi | 709/220 |
| 2006/0070003 A1 | 3/2006 | Thompson et al. | 715/758 |
| 2006/0095560 A1 | 5/2006 | Wu et al. | 709/224 |
| 2006/0130127 A1 | 6/2006 | Kaler et al. | |
| 2006/0165064 A1 | 7/2006 | Brown et al. | 370/352 |
| 2006/0167991 A1* | 7/2006 | Heikes et al. | 709/204 |
| 2006/0253458 A1 | 11/2006 | Dixon et al. | |

OTHER PUBLICATIONS

S. Blake et al., "An Architecture for Differentiated Services," RFC 2475, The Internet Society, 36 pages, 1998.
E. Crawley et al., "RFC 2386-A Framework for QoS-based Routing in the Internet," RFC 2386, The Internet Society, 31 pages, 1998.
RealVNC, *About RealVNC*, RealVNC Ltd., 3 pages, 2002-2004.
Nortel Networks, *Eliminating Boundaries*, www.nortelnetworks.com, pp. 1-10, 2004.
www.webopedia.com, *firewall* definition, 2 pages, Aug. 26, 2004.
www.webopedia.com, *virtual network computing* definition, 2 pages, Jan. 21, 2005.
Pending U.S. Appl. No. 11/089,743, entitled *Method and System Using Quality of Service Information for Influencing a User's Presence State*, by Cullen F. Jennings et al., pp. 1-34 plus 2 pages of drawings, filed Mar. 25, 2005.
Pending U.S. Appl. No. 11/129,949, entitled *Method and System Using Presence Information to Manage Network Access*, by Cullen F. Jennings et al., pp. 1-28 plus 2 pages of drawings, filed May 16, 2005.
Pending U.S. Appl. No. 11/130,439, entitled *Method and System Using Shared Configuration Information to Manage Network Access for Network Users*, by Cullen F. Jennings et al., pp. 1-40 plus 2 pages of drawings, filed May 16, 2005.
Pending U.S. Appl. No. 11/129,970, entitled *Method and System to Protect the Privacy of Presence Information for Network Users*, by Cullen F. Jennings et al., pp. 1-35 plus 3 pages of drawings, filed May 16, 2005.
PCT Search Report for International Application No. PCT/US06/17331, 9 pages, Sep. 6, 2006.
*USPTO; Office Action* for U.S. Appl. No. 11/129,949, filed May 16, 2005 in the name of Cullen F. Jennings; 13 pages, Mar. 25, 2009.
Richardson et al., "Virtual Network Computing," IEEE Internet Computing, vol. 2, No. 1, title page plus pp. 33-38, Jan./Feb. 1998.
USPTO Office Action, for U.S. Appl. No. 11/089,743, Jennings, Sep. 23, 2008.
USPTO Office Action, for U.S. Appl. No. 11/129,949, Jennings, Nov. 21, 2008.
USPTO Office Action for U.S. Appl. No. 11/089,743, filed Mar. 25, 2005, inventor Jennings, 15 pages, Apr. 15, 2009.
USPTO Office Action for U.S. Appl. No. 11/130,439, filed May 16, 2005, inventor Jennings, 13 pages, Apr. 6, 2009.
USPTO Office Action for U.S. Appl. No. 11/130,439, filed May 16, 2005, inventor Jennings, 3 pages, May 13, 2009.
USPTO Office Action for U.S. Appl. No. 11/089,743, filed Mar. 25, 2005, inventor Jennings, 12 pages, Jul. 23, 2009.
*USPTO; Office Action* for U.S. Appl. No. 11/129,949, filed May 16, 2005 in the name of Cullen F. Jennings; 14 pages, Sep. 4, 2009.
*USPTO; Office Action* for U.S. Appl. No. 11/129,970, filed May 16, 2005 in the name of Cullen F. Jennings; 10 pages, Sep. 16, 2009.
*USPTO; Office Action* for U.S. Appl. No. 11/089,743, filed Mar. 25, 2005 in the name of Cullen F. Jennings; 10 pages, Jan. 21, 2010.
State Intellectual Property Office of the People's Republic of China; The First Office Action for Application No. 200680010477.1; 9 pages, Jan. 8, 2010.
*USPTO; Office Action* for U.S. Appl. No. 11/129,949, filed May 16, 2005 in the name of Cullen F. Jennings; 16 pages, Feb. 24, 2010.
*USPTO; Office Action* for U.S. Appl. No. 11/130,439, filed May 16, 2005 in the name of Cullen F. Jennings; 12 pages, Nov. 18, 2009.
*USPTO; Office Action* for U.S. Appl. No. 11/129,949 in the name of Cullen F. Jennings; 16 pages, Aug. 27, 2010.
*USPTO Office Action* for U.S. Appl. No. 11/089,743 in the name of Cullen F. Jennings; 15 pages, Aug. 19, 2010.
*USPTO; Office Action* for U.S. Appl. No. 11/089,743 in the name of Cullen F. Jennings; 14 pages, Feb. 2, 2011.
*USPTO; Office Action* for U.S. Appl. No. 11/129,949 in the name of Cullen F. Jennings; 14 pages, Feb. 11, 2011.

* cited by examiner

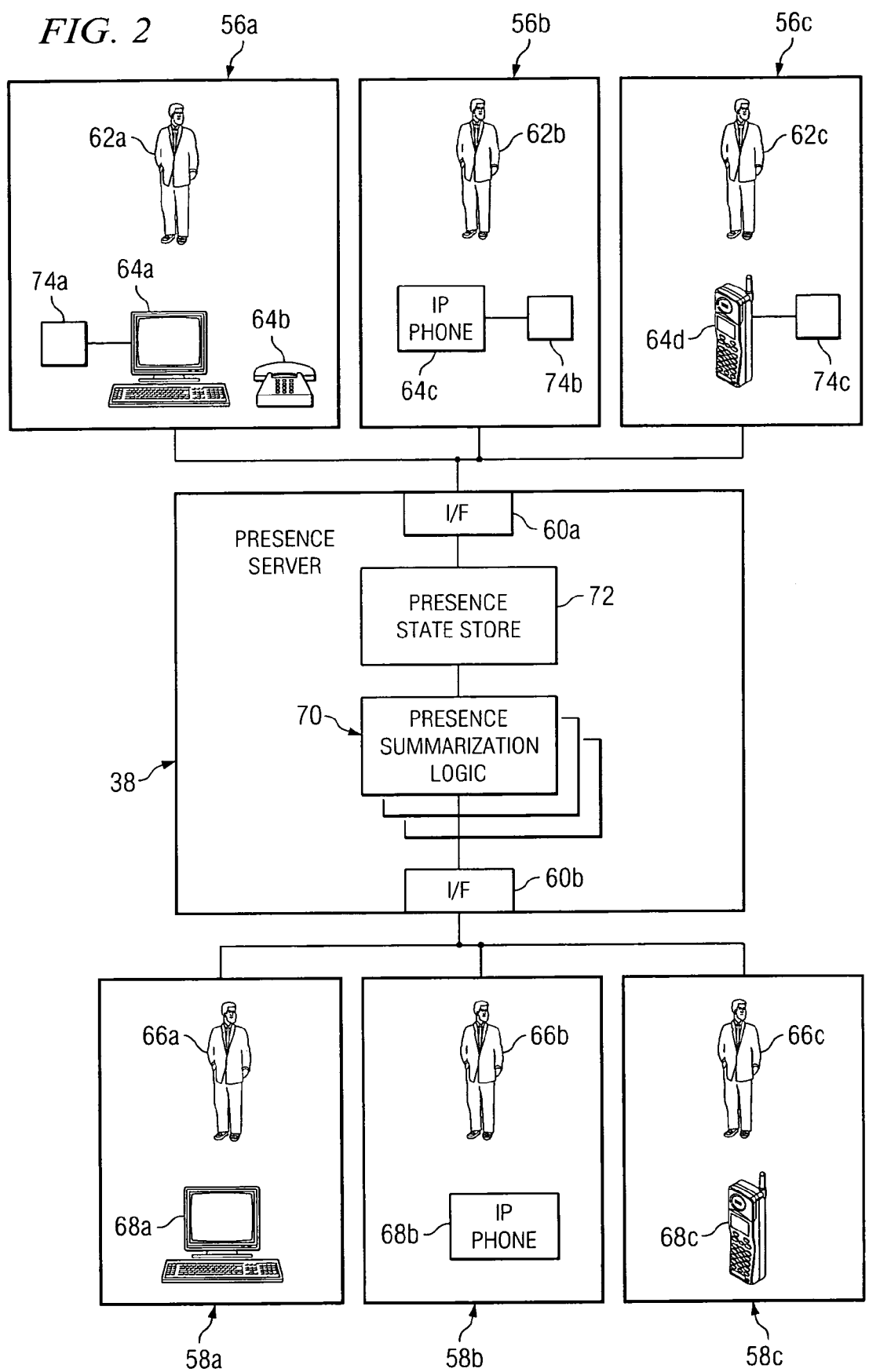

METHOD AND SYSTEM INDICATING A LEVEL OF SECURITY FOR VOIP CALLS THROUGH PRESENCE

TECHNICAL FIELD OF THE INVENTION

This invention relates in general to communication systems and, more particularly, to a method and system using presence information to provide security protection.

BACKGROUND OF THE INVENTION

The field of communications has become increasingly important in today's society. In particular, the ability to quickly and effectively interact with an individual (through any suitable communications media) presents a significant obstacle for component manufacturers, system designers, and network operators. This obstacle is made even more difficult due to the plethora of diverse communication technologies (e.g. Instant Messaging, cellular communications, simple voice sessions, etc.) that exist in the current marketplace.

As new communication platforms (such as session initiation protocol (SIP), for example) become available to the consumer, new protocols need to be developed in order to optimize this emerging technology. For example, where a user is associated with multiple endpoints, it can be anticipated that the level of security available over any one of these endpoints may vary depending upon the endpoints themselves and/or the networks traversed. Accordingly, a communication session established using one endpoint may be more secure than a communication session established with another endpoint. Without this information, however, users of a communication system cannot make educated decisions about the selection of endpoints for establishing a communication session. This deficiency presents an obstacle for any employee, employer, individual, or endpoint that seeks to execute successful, productive, and secure communication sessions.

SUMMARY OF THE INVENTION

The present invention provides a method and system providing security protection for prospective communication sessions that substantially eliminates or reduces at least some of the disadvantages and problems associated with previous methods and systems.

In accordance with a particular embodiment of the present invention, a method for providing security information associated with a prospective communication session to a user includes providing at least one communication network for the establishment of a prospective communication session between a first network device and a second network device. A security rating is assigned to the prospective communication session, and security information is provided to a user associated with the first network device that includes the security rating.

Certain embodiments of the present invention may provide a number of technical advantages. For example, according to one embodiment of the present invention, an architecture and a process are provided that allow for the continuous and/or real-time monitoring of security information associated with a plurality of endpoints and communication paths. In particular embodiments, a security level or other rating may be assigned to a proposed communication session. In other embodiments, unsecure connections between endpoints may be identified by marking either or both endpoints as unavailable. The security level, security rating, and/or any other relevant security information may be made available to end users interested in establishing a communication session. Because the information is made available to the end users prior to the establishment of the communication session, the initiator of a communication session may make meaningful decisions about the most effective way to establish a communication session with another end user. Additionally, where a communication session is established, the parties to the communication session may restrict or broaden the scope of the communication session based on the security information provided to them.

A further technical advantage may be the displaying of security information as a component or feature of presence information. Accordingly, in addition to presenting a user with a security level or rating for a proposed communication session, the availability of the user at one or more endpoints may be determined and displayed to a user. In particular embodiments, the presence information may be continuously monitored and updated. As a result, higher quality communication sessions may be established between two end users. Additionally, a higher number of successful calls may be completed, which vastly improves efficiency parameters (particularly in the workplace).

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 2 illustrates a presence server of FIG. 1 in more detail, in accordance with a particular embodiment of the present invention.

DETAILED DESCRIPTION OF THE INVENTION

Figure 1:
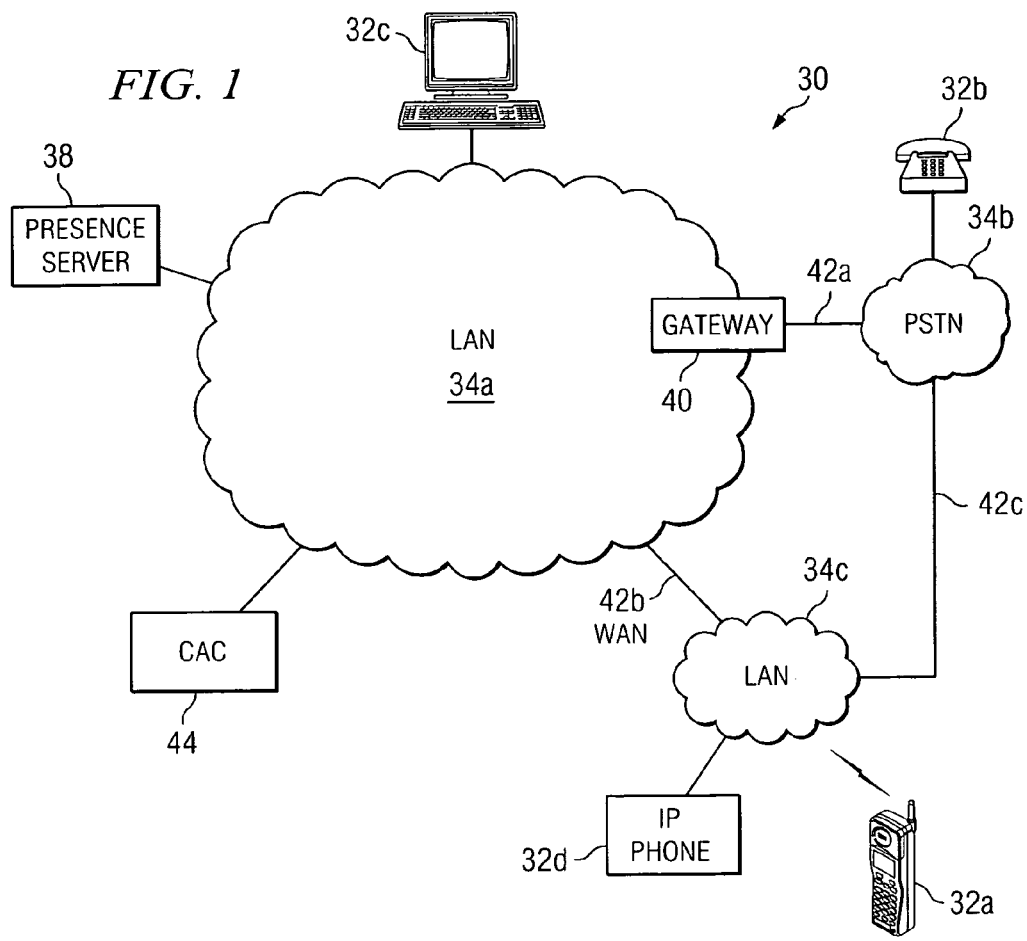
FIG. 1 illustrates a communication system using presence information to provide security protection, in accordance with a particular embodiment of the present invention.

FIG. 1 illustrates a communication system 30 for providing, to a user, security information for an anticipated communication session. System 30 includes a plurality of endpoints 32*a*-32*d* having the ability to establish communication sessions between each other, using one or more of communication networks 34*a*-34*c*. System 30 also includes a presence server 38 that operates to manage network routing information for the plurality of endpoints 32*a*-32*c*. The network routing information may be used by presence server 38 to provide end users with security information relating to an initiated or anticipated communication session. In particular embodiments, the security information may be proactively provided to the end users such that the security information may be used to make decisions regarding the initiation or establishment of communication sessions. For example, the security information may be provided to a first end user in conjunction with presence information prior to the initiation of a communication session. The first user may use the security information to select an endpoint associated with a second end user for establishing a communication session with a desired level of security. In other embodiments, the security information may be provided when a communication session is already established and may be used to make decisions about the continuation or content of the communication session.

It will be recognized by those of ordinary skill in the art that endpoints 32a-32d, presence server 38, and/or gateway 40 may be any combination of hardware, software, and/or encoded logic that provides communication services to a user. For example, each endpoint 32a-32d may include a telephone, a computer running telephony software, a video monitor, a camera, an IP phone, a cell phone or any other communication hardware, software, and/or encoded logic that supports the communication of packets of media (or frames) using communication networks 34a-34c. Endpoints 32a-32d may also include unattended or automated systems, gateways, other intermediate components, or other devices that can establish media sessions. Although FIG. 1 illustrates a particular number and configuration of endpoints, presence servers, segments, nodes, and gateways, communication system 30 contemplates any number or arrangement of such components for communicating media. Furthermore, the endpoints 32 of system 30 may be associated with any number of users.

As illustrated, system 30 includes three communication networks 34a-34c. The term "communication network" should be interpreted as generally defining any network capable of transmitting audio and/or video telecommunication signals, data, and/or messages, including signals, data or messages transmitted through text chat, instant messaging and e-mail. Generally, communication networks 34a-34c provide for the communication of packets, cells, frames, or other portions of information (generally referred to as packets herein) between endpoints 32a-32d. Communication links 42a and 42b couple communication networks 34c and 34b to communication network 34a, respectively. A communication link 42c couples communication networks 34b and 34c. Accordingly, users of endpoints 32a-32d can establish communication sessions between and among each network component coupled for communication with one or more of networks 34a-34c. A call admission control (CAC) system 44 may be used to monitor the amount of bandwidth available over WAN 42b.

In the illustrated embodiment, communication network 34a comprises a local area network (LAN) that couples multiple endpoints 32a-32d for the establishment of communication sessions between a plurality of endpoints 32a-32d distributed across multiple cities and geographic regions. Communication network 34b is a public switched telephone network (PSTN) and couples endpoint 32a with communication network 34a through gateway 40. Communication network 34c is another LAN, which couples endpoints 32a and 32d with communication network 34a. In particular embodiments, communication link 42a is a wide area network (WAN), which couples LANs 34a and 34c. However, the described communication networks 34a-34c are merely provided as an example configuration of communication networks. It is recognized that any one of networks 34a-34c may be implemented as a local area network (LAN), wide area network (WAN), global distributed network such as the Internet, Intranet, Extranet, or any other form of wireless or wireline communication network.

In particular embodiments, varying levels of security may be provided for communications communicated to, from, and through each communication network 34a-34c. The varying levels of security may range from encrypted to unencrypted, encoded to unencoded, or from secure to insecure with any number of levels in between. Typically, the security provided to a communication session is network-based. Where implemented, network security measures such as encryption and encoding, ensure that data transmitted over a network is protected from unauthorized use. In particular embodiments, network security measures can be software-based. For example, passwords may restrict access by an end user of an endpoint associated with the network to network resources. Alternatively, network security measures may be hardware-based, using a more traditional lock and key method.

The security provided for communications communicated using some combination of communication networks 34a-34c may include end to end security, segmented security, or some combination of the two. Additionally, the type of security applied to a communication may vary depending upon the technology used to transport the communication and whether the communication includes signaling, media, or a combination of the two. Although end to end security and segmented security are discussed in greater detail below, end to end security generally occurs when an endpoint 32 participating in an existing or proposed communication session is able to assure itself and other participating endpoints 32 that the communication path between the endpoints is secured. Typically, end to end security is provided when an endpoint is able to ensure that the proposed communication path between two endpoints is encrypted in a manner that only the two endpoints are able to understand and decipher the communication. Thus, the termination or initiation point of the communication determines the level of security provided to a communication using end to end security.

Conversely, segmented security is determined based upon the communication path to be used. Under principles of segmented security, a communication path is only as secure as the weakest link in that communication path. In one example scenario, assume that communication networks 34a and 34c comprise secure LANs. Because communication networks 34a and 34c are secure, communications transmitted over or through communication networks 34a and 34c may include a level of privacy that prevents the unauthorized reception and use of the communications by third parties while those communications are on the secure network(s). Accordingly, a communication that is transmitted between a first endpoint 32a and third endpoint 32c (and traverses only LAN 34c, WAN 42a, and LAN 34a) may be said to be "secure." As another example, a communication that is transmitted between first endpoint 32a and fourth endpoint 32d (and traverses only LAN 34c) may also be said to be "secure."

For example purposes only, it may be assumed that communications network 34b is an insecure PSTN network. Accordingly, communication network 34b does not include safeguards that prevent the reception by third parties of communications transmitted from or through communication network 34b. As a result, a telephone call between endpoint 32b and another endpoint (not shown) on communication network 34b may be said to be "insecure." Because communications between endpoint 32b and endpoint 32a, endpoint 32c, and endpoint 32d traverse this insecure network as well, these communications may also be said to be "insecure."

Under a segmented approach to security, whether or not a communication session is secure depends upon the path, or routing, of the communication session rather than on the initiation or termination point of the communication session. The routing of a communication session may be based on a number of factors that may include shortest path, fastest path, network load, data type, class of service, least cost, system failures, or any combination of these or other system considerations. As a result, data transmitted in a communication session may not necessarily be transmitted over what would likely be considered the most direct or efficient route. For example, the most direct route for a communication session between endpoint 32a and endpoint 32c may be over communication networks 34c and 34a. Where both communication networks 34a and 34c include secure networks, such a transmission would be secure. However, overloading on network 34c may result in the communication session being routed through communication network 34b before being transmitted to its final destination. Where communication network 34b includes an insecure network and a segmented approach to security is used, the communication session between first endpoint 32a and third endpoint 32c may be insecure despite the fact that both of first and third endpoints 32a and 32c reside on secure networks. Accordingly, and as will be described in more detail below, routing information rather than initiation and termination points may be used to determine whether a communication session is secure according to segmented security.

In a particular embodiment, communication network 34a employs voice communication protocols that allow for the addressing or identification of endpoints and other network devices coupled to communication network 34a. For example, using Internet protocol (IP), each of the components coupled together by communication network 34a in communication system 30 may be identified in information directed using IP addresses. In this manner, network 34a may support any form and/or combination of point-to-point, multicast, unicast, or other techniques for exchanging media packets among components in communication system 30. Any network components capable of exchanging audio, video, or other data using frames or packets, are included within the scope of the present invention.

Network 34a may be directly coupled to other IP networks including, but not limited to, another LAN, or the Internet. Since IP networks share a common method of transmitting data, telecommunication signals may be transmitted between telephony devices located on different, but interconnected, IP networks. In addition to being coupled to other IP networks, communication network 34a may also be coupled to non-IP telecommunication networks through the use of interfaces or components, for example gateway 40. In the illustrated embodiment, communication network 34a is coupled with PSTN 34b through gateway 40. PSTN 34b includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 34b), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, endpoint 32d and gateway 38 are IP telephony devices. IP telephony devices have the ability of encapsulating a user's voice (or other input) into IP packets so that the voice can be transmitted over network 34a. IP telephony devices may include telephones, fax machines, computers running telephony software, nodes, gateways, or any other device capable of performing telephony functions over an IP network. Using VoIP and VoP technology, communications that include media are typically secured using end to end security by Secure Realtime Transport Protocol (SRTP).

In particular embodiments, communication system 30 may receive and transmit data in a session initiation protocol (SIP) environment. SIP is an application-layer control protocol that includes primitives for establishing, modifying, and terminating communication sessions. SIP works independently of underlying transport protocols and without dependency on the type of session that is being established. SIP also transparently supports name mapping and redirection services, which support personal mobility. Communications that include signaling and are transported in a SIP environment are typically secured using Secure Multipurpose Internet mail Extensions (S/MIME) to provide end to end security.

In particular embodiments, users of endpoints 32a-32d may be identified by components of system 30 according to a uniform reference identifier (URI), such as a user's email address, or other suitable identifier so that a user may be located, monitored, and/or contacted through presence detection technology. Presence detection technology allows end users to maintain a single externally visible identifier regardless of their network location. For example, SIP features enable endpoints 32a-32d to discover one another and to agree on a characterization of a session they would like to share. For locating prospective session participants, and for other functions, SIP enables the creation of an infrastructure of network hosts, such as presence server 38, to which users of endpoints 32a-32d can send registrations, invitations to sessions, and other requests.

Components of system 30 may capture information about various communication devices, or endpoints, available to a user and their status, such as whether a cellular phone is switched on or whether a user is logged into a personal computer (PC). Specifically, the SIP technology allows users of endpoints 32a-32d to query for the presence of a particular user of an end point. This would provide a presence availability status for the end user, as well as location information, device information, and any personal presence status that the caller wishes to communicate to the called party. Hence, communication system 30 builds on existing SIP capabilities and, further, extends them to provide enhanced information to the calling party. This may be achieved using a VoIP platform. The versatility of the presence detection technology, however, enables it to be used in both IP components, such as IP phone 32d, and other non-IP components, such as components of PSTN 34b.

In particular embodiments, SIP may also include primitives supporting session setup capabilities. In an example scenario, a first end user of endpoint 32a may desire to establish a communication session with a second end user. As described above, the second end user may be associated with endpoint 32b and endpoint 32c. In accordance with the teachings of the present invention, communication system 30 offers an interface on endpoint 32a that may be displayed to the first end user to facilitate the establishment of an optimum call session between the respective parties. Specifically, the interface may display presence information for the second end user. The presence information may identify the endpoints 32b or 32c through which the second user is available as well as security information associated with endpoints 32b or 32c and/or the prospective communication session. Thus, the architecture of communication system 30 allows the first end user of endpoint 32a to make a proactive or real time decision about the establishment of a communication session before the communication session is initiated from endpoint 32a.

For providing security protection to endpoints 32a-32c, presence server 38 may include appropriate software, hardware, and/or encoded logic for maintaining end to end and/or segmented security information for endpoints 32. For example, where first end user at endpoint 32a desires to establish a voice communication session with a second end user associated with endpoint 32b, which comprises a telephone, and endpoint 32c, which comprises a computing device, presence server 38 may maintain end-to-end security information associated with the respective endpoints 32a-32c. The end to end security information may identify whether or not endpoint 32c is able to ensure that communications transmitted between endpoint 32a and endpoint 32c will be encrypted using S/MIME, SRTP, or another communication transport technology. For example, the security information may include an icon or other indicator that identifies to the first end user that endpoint 32c is a secure endpoint (i.e., able to ensure that communications transmitted between endpoint 32a and endpoint 32c will be encrypted in a manner providing security protection to the communications). However, a different icon or indicator may be used to identify to the first end user that endpoint 32b is an insecure endpoint (i.e., not able to ensure that communications transmitted between endpoint 32a and endpoint 32b will be encrypted in a manner providing security protection to the communications).

Segmented security information may be provided in addition to or as an alternative to end to end security information. To provide segmented security information to the end users, presence server 38 identifies a communication path between two endpoints 32. Presence server 32 then determines each network 34a-34c traversed by the communication path and identifies the level of security provided at the weakest link on the proposed communication path between the endpoints 32. For example, assume that the communication network includes three networks, A, B, and C. A communication path between two endpoints coupled by some combination of networks A, B, and C is only as secure as the most insecure network. In the simplest scenario, the communication path between two endpoints might traverse only network A. This communication would be considered an intra-enterprise communication and would be identified to have one level of security. Within an enterprise, the communication path between the two endpoints would typically be considered secure. A Virtual Path Network (VPN) connection to one of the two endpoints probably does not change the level of security provided over network A.

In a slightly more complex scenario, the communication path between the two endpoints might traverse both network A and network B. If network B is considered a "foreign network" because it is outside the enterprise associated with network A, the security provided to the communication path is only as secure as the security provided over network B. Thus, if network B is a secure network, the communication path would be considered secure. If, however, network B is an insecure network, the communication path would be insecure. An identifier or other icon maintained by presence server 38 may identify network B, as appropriate, to the endpoint, such as first endpoint 32a, through which communication is sought to be established. Other types of networks and connections that might also affect the security provided over a communication path and, thus, may be identified to an end user through security information maintained by presence server 38 may include a communication path through a trusted Internet Service Provider (ISP), a communication path through an untrusted ISP, a communication path through a PSTN network, a connection to a PSTN gateway, or any combination of these elements. PSTN networks typically provide some level of security though the level of security may not result in a completely secure communication.

As described above, the security information obtained for endpoints 32a-32c (using either an end to end or segmented approach) is stored in and maintained by presence server 38. The first end user of endpoint 32a may access presence information for the second end user and the associated endpoints 32b and 32c prior to the establishment of the communication session. Depending upon the particular embodiment implemented, the presence information may be displayed to the first end user over a display associated with endpoint 32a, a computer, or another network device. For example, the presence information displayed to the first end user may indicate that the second end user is available to take a call on endpoint 32b or to receive an instant message or email message on endpoint 32c.

The security information gathered by presence server 38 using any of the above or other known techniques may be provided to end users for the selective establishment of communication sessions. Stated differently, an end user who desires to initiate a communication session with another end user may access presence information and security information to determine the endpoints that can communicate with one another to obtain a desired level of security. Thus, in particular embodiments, the security information may rate or otherwise qualify the prospective communication sessions between two endpoints. In the above-described example, presence server 38 may provide information to the end user of endpoint 32a that indicates that a communication session established with endpoint 32b would result in an insecure communication session and that a communication session established with endpoint 32c would result in a secure communication session. The first end user may then use this security information to determine the endpoint 32b or endpoint 32c with which first end user should seek to initiate an actual communication session.

FIG. 2 illustrates presence server 38 in more detail, in accordance with a particular embodiment of the present invention. Examples of presence servers include presence servers as defined by Internet Society, such as in RFC2778. Specifically, presence server 38 is coupled to one or more presentities 56 and one or more presence watchers 58 through communication networks 34a-34c. Interfaces 60 allow presence server 38 to obtain information from presentities 56 and provide information to presence watchers 58. As will be described in more detail below, presentities 56a-56 include end users 62a-62c (and associated endpoints 64a-64d) who provide presence information to presence server 38 for distribution to other end users. Conversely, presence watchers 58a-58c include an end users 66a-66c (and associated endpoints 68a-68c) that receive presence information about other end users from presence server 38. Although presentities 56 and presence watchers 58 are illustrated as being exclusive from one another, it is generally recognized that an end user and its associated endpoints may both provide information to and receive information from presence server 38. Accordingly, any end user of presence server 38 may be both a presentity and a presence watcher.

Continuing the example scenario from above, an end user, such as first end user 62a, provides presence information to presence server 38 through interface 60a. When a presence watcher, such as second end user 66a, desires to reach first end user 62a associated with second and third endpoints 64b and 64c, presence server 38 is used to provide security information to second end user 66a. The security and other presence information may be used by second end user 66a, as a presence watcher, to determine the availability of first end user 62a at endpoints 64a and 64b, respectively.

Processor 70, which is illustrated as presence summarization logic 70, may include any combination of hardware (microprocessors, controllers, or other suitable computing devices or resources), software, and/or encoded logic that may be used to monitor the presence of an end user at an endpoint. In particular embodiments, presence server 68 comprises a single computer or a group of computers that are capable of receiving presence information regarding one or more presentities, such as first end user 62*a*, and selectively provide that information to one or more presence watchers, such as second end user 66*a*. In particular embodiments, processor 70 cooperates with a memory module 72, illustrated as presence state store 72, to provide presence information and security information to presence watchers 58*a*-58*c*, such as second end user 66*a*.

Generally, processor 70 may detect the presence of end users 62*a*-*c* at endpoints 64*a*-64*c*. For example, processor 70 may receive presence information from one or more of presence clients 74*a*-74*c* at the end user's endpoint 64*a*-64*c*, for example, at the end user's PC, phone, personal digital assistant (PDA) or any other presence client device (e.g., presence clients 74*a*-72*c*). In particular embodiments, for example, presence clients 74 include software or hardware-embodied in a telecommunications switch that determines the hook status of a telephone or other device. In other embodiments, presence clients 74 include software that monitor whether an endpoint comprising a computer is logged into. In still other embodiments, presence clients 74 comprise a device that communicates with an ID tag worn by an end user 62 to indicate the location of end user 62. However, although particular presence clients 74 are described, a variety of presence clients 74 may be utilized according to the teachings of the invention to provide presence information regarding the availability, location, or activity in which an end user 62 is engaged.

In particular embodiments, the presence information obtained about an end user 62 includes the "state" of that end user 62. End users 62 may be placed in various states, such as a "ready" state, a "not ready" state, and a "talking" state, according to the current status of the endpoint 64 with respect to presence server 38. For example, an end user 62 in a ready state may be ready and able to accept an incoming call. Accordingly, such an end user 62 may be said to be "available." Conversely, an end user 62 in a not ready state may be away from his desk or otherwise not ready to accept an incoming call, and an end user 62 in a talking state may currently be communicating on an incoming or outgoing call. In either case, the end user 62 may be said to be "unavailable."

As described above, the presence information provided to presence watchers, such as end users 66, may include end to end security information relating to the participating endpoints 64 or segmented security information associated with a communication path. Accordingly, processor 70 includes hardware, software, and/or logic for obtaining and managing security information using one or both of the above-described techniques. Specifically, processor 70 may determine one or more security levels or other ratings for each proposed communication session. For example, with respect to the proposed communication session between endpoint 64*a* and endpoint 68*a*, processor 70 may assign a security level or rating of "insecure" to the proposed communication session. Conversely, with respect to the proposed communication session between endpoint 64*b* and endpoint 68*a*, processor 70 may assign a security level or rating of "secure" to the proposed communication session. The assigned security levels or security ratings may then be incorporated into presence information and provided to second end user 66*a*, as a presence watcher. Second end user 66*a* may then use the presence and/or security information to make decisions about the establishment of a communication session with first end user 62*a*. Where both segmented and end to end security techniques are implemented, the security information may, in particular embodiments, display only the segmented security information to the end user since segmented security determinations are typically more reliable than end to end security determinations.

In various embodiments, data in memory module 72 may be accessed to provide the presence and security information to a presence watcher. Memory module 72 may be any form of volatile or non-volatile memory including, without limitation, magnetic media, optical media, random access memory (RAM), read-only memory (ROM), removable media, or any other suitable local or remote memory component. In particular embodiments, memory module 72 includes a list for some or all of end users 62*a*-*c* and 58*a*-*c*. The lists may include subscription lists, buddy lists, or other association information. For example, rather than make presence information for every end user 62*a*-62*c* and 68*b*-68*c* within system 30 available to second end user 66*a*, first end user 62*a*, as a presentity, may subscribe to a presence service. Accordingly, the subscription may identify to whom first end user 68*a* wants his presence information made available to and to what extent such information should be available. Thus, in a particular embodiment, first end user 62*a* may exert an amount of control over his own presence information. Additionally or alternatively, second end user 66*a*, as a presence watcher, may be required to subscribe to receive presence information. Thus, the subscription lists, buddy lists, or other association information may also or alternatively identify those end users 62*a*-62*c* for which second end user 66*a* would like to receive presence information.

In the example scenario where second end user 66*a* desires to initiate a communication session with first end user 62*a*, second end user 66*a* may obtain presence information for all end users 62*a*-*c* on the subscription or buddy list of second end user 66*a*. Accordingly, if second end user 66*a* has subscribed only to receive presence information for first end user 62*a*, presence server 38 will only make presence information for first end user 62*a* available to second end user 66*a*. Presence information for a third end user 62*b* and a fourth end user 62*c* will not be made available to second end user 66*a*. Before establishing a communication session with first end user 62, second end user 66*a* may reference the presence information associated with first end user 62*a* to determine whether second end user 66*a* should initiate a communication session with first end user 62*a* through endpoint 62*a* or endpoint 64*b*. For example, second end user 66*a*, as a presence watcher, may use the information to determine whether he should send first end user 62*a* an email to be delivered at endpoint 64*a* (i.e., a computer) or call first end user 62*a* on endpoint 62*b* (i.e., a telephone).

As described above, the presence information may include security information that indicates a security level or security rating that can be expected if a communication session is established between any two endpoints 64. In the example scenario described above, the use of a subscription list or buddy list prevents presence server 38 from having to monitor security information between all endpoints in system 30. Thus, where second end user 66*a* subscribes to or is otherwise entitled to receive presence information for only first end user 62*a*, presence server 38 may only provide security information to second end user 66*a* that relates to first end user 62*a*. Presence information for third and fourth end users 62*b* and 62*c* may not be provided to second end user 66*a*. Accordingly, the subscription list or buddy list utilized from memory module 72 prevents system 30 from being overburdened with obtaining and managing security information for communication sessions between each and every endpoint using system 30.

Although subscription lists and buddy lists are described above for associating users of system 30 with other users of system 30, it is recognized that any other mechanism for the linkage or association of users may be utilized. It is also recognized that the such mechanisms need not be stored in memory module 72 but may be stored in any component of system 30. In particular embodiments, such mechanisms may be stored at the endpoints. Other example sources of association information that may be used to provide presence information include address lists from an email program (i.e., MicroSoft Outlook), information provided by social networks or reputation services, or association lists such as those used by Five Degrees of Separation, Linked In, and Orchid.

Furthermore, although security information is described above as comprising a feature or component of presence information, it is generally recognized that security information may be provided to an end user 66 in lieu of or independently of any presence information provided by presence server 38. In particular embodiments, the security information may be provided to an end user 66 by way of a display that is associated with an endpoint 68 used by the end user 66. For example, if second end user 66a desires to establish a communication session with first end user 62a, second end user 66a may use endpoint 68a to initiate the communication session in a normal manner (i.e., call first end user 62a on endpoint 64b by dialing the telephone or extension number associated with endpoint 64b). In particular embodiments and as described above, a security level identifier such as a locked or unlocked icon may then be displayed to second end user 66a on a display associated with endpoint 68a or on another network device associated with second end user 66a. Second end user 66a may then use this information to decide whether to continue the communication session with first end user 62a. Where the communication session is continued, the security level identifier provided to second end user 66a may influence the content of the communication session. In this manner, second end user 66a can make real-time educated decisions about whether a confidential or other sensitive matter should be discussed or otherwise included in the communication session.

Thus, it will be recognized by those of ordinary skill in the art that presence server 38 is merely one example configuration of a network device for providing security and other presence information to end users 66 in communication system 30. It is generally recognized that presence server 38 may include any number of processors, queues, distributors, or memory modules to accomplish the functionality and features described herein. Additionally, processor 70 and memory module 72 associated with presence server 38 may be centrally located (local) with respect to one another, or distributed throughout communication networks 34.

Figure 3:
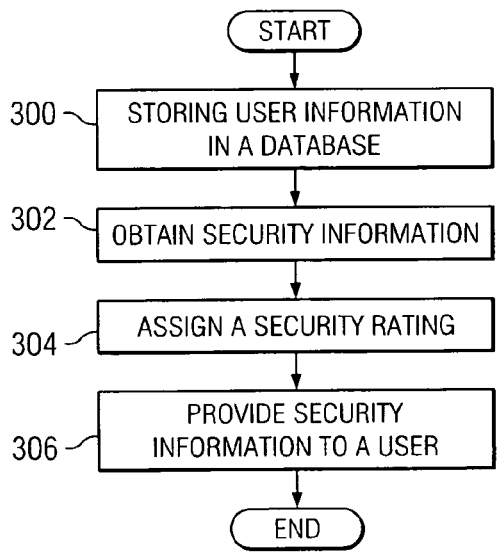
FIG. 3 illustrates an example method using presence information to provide security protection, in accordance with an embodiment of the present invention.

FIG. 3 illustrates an example method for providing security and other presence information for a plurality of users, in accordance with an embodiment of the present invention. The method begins at step 300 with the storing of user information in a database. In particular embodiments, the user information may include subscription lists, buddy lists, address lists, contact lists, social network information, or other association information that may link a plurality of users using a network or combination of networks for communication.

At step 302, security information is obtained for one or more endpoints 32 using the one or more networks and/or for one or more communication paths between those endpoints 32. In particular embodiments, obtaining the security information may include using end to end security provisioning to determine the ability of the endpoints 32 to provide for or ensure secure communications. Additionally or alternatively, obtaining the security information may include using segmented security provisioning to identify one or more communication paths between the endpoints 32. Each communication path includes the networks to be traversed by a communication session that is established between the endpoints 32. With respect to the networks traversed, the security level or other rating associated with each of the networks may be identified and the weakest link in the communication path (i.e., the most insecure network) identified. In particular embodiments, the security level or rating of each network may include secure, insecure, unencrypted, encrypted, and any of a variety of levels in between. For example, if the communication path includes an insecure PSTN network, such as network 34b, the communication path associated with the endpoints 32 may be identified as insecure. As another example, if the communication path includes a secure LAN, such as network 34a or network 34b, the communication path between the endpoints may be identified as secure. The security rating is assigned to the endpoint 32 with whom communication is sought at step 304.

At step 306, security information is provided to the first user. As stated above, the security information includes the security rating assigned to the endpoint 32 with whom communication (i.e., second end user) is sought. Where the second end user is associated with two or more endpoints, security information may be provided to the first user for each endpoint associated with the second end user. In particular embodiments, the security information may be displayed to the first user on an endpoint used by the first user. For example, the security information may be displayed as one or more icons on a screen associated with a telephone used by the first user. Thus, where a communication session with an endpoint 32 associated with the second end user is determined to be secure, a closed lock or other security identifier may be displayed on the screen. Conversely, where a communication session with an endpoint 32 associated with the second end user is determined to be insecure, an open lock or other security identifier may be displayed on the screen.

In particular embodiments, the security information may be presented to the first user as a portion of, component of, or in conjunction with presence information. The presence information may include availability information associated with any of endpoints 32 being monitored. For example, if endpoint 32a associated with the first end user comprises a cell phone, the presence information may identify whether the first user is available to take a phone call over the cell phone.

Some of the steps illustrated in FIG. 3 may be combined, modified or deleted where appropriate, and additional steps may also be added to the flowchart. Additionally, steps may be performed in any suitable order without departing from the scope of the invention.

As indicated above, technical advantages of particular embodiments of the present invention include the continuous and/or real-time monitoring of security information associated with a plurality of alternate communication paths. In particular embodiments, a security level or other rating may be assigned to an endpoint and/or a proposed communication session with that endpoint. The security level, security rating, and/or any other relevant security information may then be made available to end users interested in establishing a communication session with that endpoint. Because the information is made available to the end users prior to the establishment of the communication session, the initiator of a communication session may make meaningful decisions about the most effective way to establish a communication session with another end user. Additionally, where a communication session is established, the parties to the communication session may restrict or broaden the scope of the communication session based on the security information provided to them.

Further technical advantages may include the display of security information as a component or feature of presence information. Accordingly, in addition to presenting a user with a security level or rating for a proposed communication session, the availability of the user at one or more endpoints may be determined and displayed to a user. Additionally, the presence information may be continuously monitored and updated. As a result, higher quality communication sessions may be established between two end users. Additionally, a higher number of successful calls may be completed, which vastly improves efficiency parameters (particularly in the workplace).

Although the present invention has been described in detail with reference to particular embodiments, it should be understood that various other changes, substitutions, and alterations may be made hereto without departing from the spirit and scope of the present invention. For example, although the present invention has been described with reference to a number of elements included within a communication system, these elements may be combined, rearranged or positioned in order to accommodate particular routing architectures or needs. In addition, any of these elements may be provided as separate external components to a communication system or to each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for providing security information associated with a communication session to a user, comprising:
    facilitating the establishment of a communication session between a selected one of:
        a first network device associated with a first user and a second network device associated with a second user that traverses a first communication network and a second communication network; and
        the first network device and a third network device associated with the second user that traverses a third communication network and a fourth communication network;
    determining security information of the first communication network, the second communication network, the third communication network and the fourth communication network;
    assigning a security rating to the communication session based on the determined security information, the assigning a security rating comprising:
        identifying a first communication path for the communication session between the first network device and the second network device, the first communication path traversing the first communication network and the second communication network;
        identifying a second communication path for the communication session between the first network device and the third network device, the second communication path traversing the third communication network and the fourth communication network;
        determining a security level provided by each of the first communication network, the second communication network, the third communication network and the fourth communication network;
        identifying a lowest security level of the security levels; and
        assigning a security rating to the communication session based on the identified lowest security level; and
    before establishing the communication session, providing security information for the communication session to a user associated with the first network device that includes the assigned security rating; and
    based on the provided security information, receiving a user selection from the first user, the user selection selecting one of the first communication path and the second communication path for the communication session.

2. The method of claim 1, wherein facilitating the establishment of communication session comprises providing the first communication network and the second communication network for the communication of signaling.

3. The method of claim 1, wherein facilitating the establishment of the communication session comprises providing the first communication network for the communication of media.

4. The method of claim 1, wherein assigning the security rating further comprises obtaining security information pertaining to the ability of the second network device to ensure that the communication session will be secure.

5. The method of claim 1, further comprising:
    assigning an insecure security rating to the communication session if one or more of the first communication network and the second communication network has a security level of insecure; and
    assigning a secure security rating to the communication session if the first communication network and the second communication network have a security level of secure.

6. The method of claim 1, further comprising:
    assigning an insecure security rating to the communication session if a selected one of the first communication network and the second communication network comprise an unencrypted network; and
    assigning a secure security rating to the communication session if the first communication network and the second communication network are encrypted networks.

7. The method of claim 1, wherein providing the security information to the user associated with the first network device includes displaying an icon identifying the security rating on an endpoint used by the first user.

8. The method of claim 1, further comprising providing presence information to the first user.

9. The method of claim 8, wherein providing the presence information comprises:
    determining the availability of a user associated with the second network device to the establishment of the communication session between the first network device and the second network device; and
    displaying the availability of the user associated with the second network device to the user associated with the first network device.

10. The method of claim 1, further comprising:
    maintaining an association list identifying a plurality of end users with whom the user associated with the first network device is associated;

obtain security information for a plurality of prospective communication sessions between the first network device and the plurality of end users;
assigning a security rating to each of the plurality of prospective communication sessions; and
providing security information to the user associated with the first network device that includes the security rating assigned to each of the plurality of prospective communication sessions.

11. The method of claim 10, further comprising:
receiving a user selection, from the user associated with the first network device, identifying a selected prospective communication session from the plurality of prospective communication sessions; and
establishing the communication session in response to receiving the user selection.

12. A system for providing security information associated with a prospective communication session to a user, comprising:
a plurality of endpoints operable to establish one or more communication sessions over a network; and
a processor coupled to the network, the processor operable to:
provide at least one communication network for the establishment of a communication session between a first network device and a second network device;
facilitate the establishment of a communication session between a selected one of:
a first network device associated with a first user and a second network device associated with a second user that traverses a first communication network and a second communication network; and
the first network device and a third network device associated with the second user that traverses a third communication network and a fourth communication network;
determine security information of the first communication network, the second communication network, the third communication network and the fourth communication network;
assign a security rating to the communication session based on the determined security information, the assigning a security rating comprising:
identifying a first communication path for the communication session between the first network device and the second network device, the first communication path traversing the first communication network and the second communication network;
identifying a second communication path for the communication session between the first network device and the third network device, the second communication path traversing the third communication network and the fourth communication network;
determining a security level provided by each of the first communication network, the second communication network, the third communication network and the fourth communication network;
identifying a lowest security level of the security levels; and
assigning a security rating to the communication session based on the identified lowest security level; and
before establishing the communication session, provide security information for the prospective communication session to a user associated with the first network device that includes the assigned security rating; and
based on the provided security information, receiving a user selection from the first user, the user selection selecting one of the first communication path and the second communication path for the communication session.

13. The system of claim 12, wherein the first communication network and the second communication network provide for the communication of signaling.

14. The system of claim 12, wherein the first communication network and the second communication network provide for the communication of media.

15. The system of claim 12, wherein the processor is further operable to assign the security rating by obtaining security information pertaining to the ability of the second network device to ensure that the communication session will be secure.

16. The system of claim 12, wherein the processor is further operable to:
assign an insecure security rating to the communication session if one or more of the first communication network and the second communication network has a security level of insecure; and
assign a secure security rating to the communication session if the first communication network and the second communication network have a security level of secure.

17. The system of claim 12, wherein the processor is further operable to:
assign an insecure security rating to the communication session if one or more of the first communication network and the second communication network comprise an unencrypted network; and
assign a secure security rating to the communication session if the first communication network and the second communication network are encrypted networks.

18. The system of claim 12, wherein the processor is further operable to provide the security information to the user associated with the first network device by displaying an icon identifying the security rating on an endpoint used by the first user.

19. The system of claim 12, wherein the processor is further operable to provide presence information to the first user.

20. The system of claim 19 wherein the processor is further operable to provide the presence information by:
determining the availability of a user associated with the second network device to the establishment of the communication session between the first network device and the second network device; and
displaying the availability of the user associated with the second network device to the user associated with the first network device.

21. The system of claim 12, wherein the processor is further operable to:
maintain an association list identifying a plurality of end users with whom the user associated with the first network device is associated;
obtain security information for a plurality of prospective communication sessions between the first network device and the plurality of end users;
assign a security rating to each of the plurality of prospective communication sessions; and
provide security information to the user associated with the first network device that includes the security rating assigned to each of the plurality of prospective communication sessions.

22. The system of claim 21, wherein the processor is further operable to:
receive a user selection, from the user associated with the first network device, identifying a selected prospective communication session from the plurality of prospective communication sessions; and establish the communication session in response to receiving the user selection.

23. A system for providing security information associated with a communication session to a user, comprising:
  means for facilitating the establishment of a communication session between a selected one of:
    a first network device associated with a first user and a second network device associated with a second user that traverses a first communication network and a second communication network; and
    the first network device and a third network device associated with the second user that traverses a third communication network and a fourth communication network;
  means for determining security information of the first communication network, the second communication network, the third communication network and the fourth communication network;
  means for assigning a security rating to the communication session based on the determined security information, the assigning a security rating comprising:
    identifying a first communication path for the communication session between the first network device and the second network device, the first communication path traversing the first communication network and the second communication network;
    identifying a second communication path for the communication session between the first network device and the third network device, the second communication path traversing the third communication network and the fourth communication network;
    determining a security level provided by each of the first communication network, the second communication network, the third communication network and the fourth communication network;
    identifying a lowest security level of the security levels; and
    assigning a security rating to the communication session based on the identified lowest security level; and
  means for, before establishing the communication session, providing security information for the communication session to a user associated with the first network device that includes the assigned security rating; and
  means for, based on the provided security information, receiving a user selection from the first user, the user selection selecting one of the first communication path and the second communication path for the communication session.

24. A non-transitory computer readable storage medium comprising logic, the logic operable, when executed on a processor, to:
  facilitate the establishment of a communication session between a selected one of:
    a first network device associated with a first user and a second network device associated with a second user that traverses first communication network and a second communication network; and
    the first network device and a third network device associated with the second user that traverses a third communication network and a fourth communication network;
  determine security information of the first communication network, the second communication network, the third communication network and the fourth communication network;
  assign a security rating to the communication session based on the determined security information, the assigning a security rating comprising:
    identifying a first communication path for the communication session between the first network device and the second network device, the first communication path traversing the first communication network and the second communication network;
    identifying a second communication path for the communication session between the first network device and the third network device, the second communication path traversing the third communication network and the fourth communication network;
    determining a security level provided by each of the first communication network, the second communication network, the third communication network and the fourth communication network;
    identifying a lowest security level of the security levels; and
    assigning a security rating to the communication session based on the identified lowest security level; and
  before establishing the communication session, provide security information for the communication session to a user associated with the first network device that includes the assigned security rating; and
  based on the provided security information, receiving a user selection from the first user, the user selection selecting one of the first communication path and the second communication path for the communication session.

* * * * *